358-140. OR 3,457,369 SR SEARCH ROOM

T5055

INVENTORS
Robin E. Davies
Douglas Howorth
BY Kemon, Palmer, Stewart & Estabrook
ATTORNEY.

INVENTORS
Robin E. Davies
Douglas Howorth
BY Kemon, Palmer, Stewart & Estabrook
ATTORNEY INVENTORS
Robin E. Davies
Douglas Howorth
BY Lemon, Palmer, Stewart & Estabrook
ATTORNEYS INVENTORS
Robin E. Davies
Douglas Howorth
BY Emon, Palmer
Stewart & Estabrook
ATTORNEYS INVENTOR
Robin E. Davies
Douglas Haworth
BY Kemon, Palmer
Stewart & Estabrook
ATTORNEY INVENTORS
Robin E. Davies
Douglas Howorth
BY Lemon, Palmer
Stewart & Estabrook
ATTORNEYS United States Patent Office 3,457,369
Patented July 22, 1969

3,457,369
TELEVISION FIELD-REPETITION FREQUENCY CONVERSION USING VARIABLE DELAY

Robin Evan Davies, Horley, and Douglas Howorth, Horsham, England, assignors to The Marconi Company Limited, London, England, and Standard Telephones & Cables Limited, London, England Filed Feb. 1, 1966, Ser. No. 524,170
Claims priority, application Great Britain, Feb. 4, 1965, 4,965/65
Int. Cl. H04n 5/04; H03h 9/30
U.S. Cl. 178—6.8 5 Claims

ABSTRACT OF THE DISCLOSURE

Apparatus for generating from an input television signal an output television signal having a different field repetition frequency, in which the input signal is fed to a variable delay circuit, the delay of which is progressively varied from one extreme value (maximum or minimum) to the other in discrete units of delay substantially equal to a small integral multiple of the difference between the input and output field periods, the delay being changed by one such unit at intervals of a small integral multiple of one output field period, and then returned directly to the first said extreme value, and the delay thereby introduced by the variable delay circuit is substantially uniformly distributed over the fields of the output signal.

Figure 1:
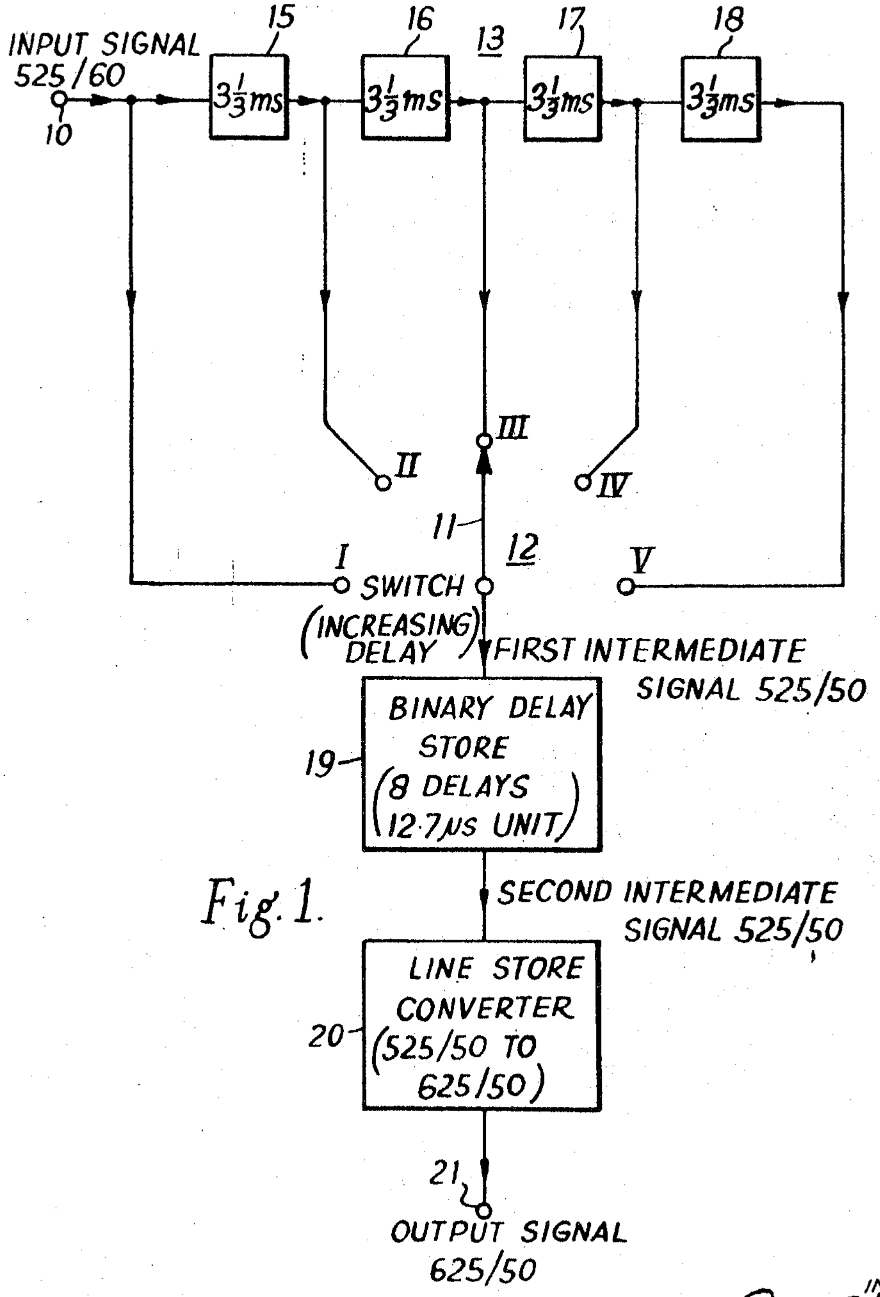

The present invention relates to the conversion of television signals from one field repetition frequency to another, and consists of an improvement in or modification of the invention which is the subject of our co-pending application Ser. No. 411,398, now U.S. Patent No. 3,400,211.

The invention has particular, but not exclusive, application to the conversion of television signals having 60 fields per second and 525 lines per picture to signals having 50 fields per second and 625 lines per picture. In such signals each picture is composed of two interlaced fields which occur consecutively in the signal. In this specification, signals having 60 fields per second and 525 lines per picture will be referred to as 525/60 signals, those having 50 fields per second and 625 lines per picture as 625/50 signals, and so on.

There are described in the specification accompanying the parent application a number of systems for the conversion of television signals from one field repetition frequency to another, and these systems can be regarded as being divided into two groups, namely those in which a delay introduced in the input signal is changed at time intervals equal to a small integral multiple of (one, two or three times) the input field period, and those in which a delay introduced in the input signal is changed at time intervals equal to an integral multiple of the input line period. These two systems will be referred to hereinafter as the first field conversion system and the second field conversion system respectively.

The first field conversion system is, in comparison to the second, easier to instrument since it contains fewer delays, but it produces a picture of incorrect size relative to the raster. The present invention relates to systems which are similar in principle to the second field conversion system and may be regarded as alternative to it, having the same conversion facilites.

According to the present invention there is provided apparatus for generating at an output terminal, from an input television signal applied at an input terminal, an output television signal having a lower field repetition frequency than that of the input signal, the apparatus comprising, coupled betwen the input and output terminals, a variable delay circuit the delay of which is variable in discrete units of delay each of which is substantially equal to a small integral multiple of the difference between an input and an output field period, and means for increasing, by one discrete delay unit at regular time intervals, each of which is equal to a small integral multiple of one output field period, the delay of the delay circuit from a minimum to a maximum value, and for returning the delay directly to the minimum value, the difference between the maximum and minimum values of the delay being such that, on the return of the delay to the minimum value, a small integral number of input fields are discarded from the input signal, the apparatus also including means for distributing evenly over the fields of the output signal the discrete-unit delay introduced in the input signal by the variable delay circuit.

There is also provided in accordance with the invention apparatus for generating at an output terminal, from an input television signal applied at an input terminal, an output television signal having a higher field repetition frequency than that of the input signal, the apparatus comprising, coupled between the input and output terminals, a variable delay circuit the delay of which is variable in discrete units of delay each of which is substantially equal to a small integral multiple of the difference between an input and an output field period, and means for decreasing, by one discrete delay unit at regular time intervals each of which is equal to a small integral multiple of one output field period, the delay of the delay circuit from a maximum to a minimum value, and for returning the delay directly to the maximum value, the difference between the maximum and minimum values of the delay being such that, on the return of the delay to the maximum value, a small integral number of output fields are repeated in the output signal, the apparatus also including means for distributing evenly over the fields of the output signal the loss of input signal which occurs during the decreases in the delay of the variable delay circuit.

The distributing means may comprise a further variable delay circuit the delay of which is variable in discrete units of delay each of which is substantially equal to a small integral multiple of the difference between an input line period and an output line period, and means for varying, by one discrete delay unit at regular time intervals each of which is equal to a small integral multiple of one output line period, the delay of the further delay circuit from a first to second extreme value, one of these values being a maximum and the other a minimum value, and for returning the delay directly to the first extreme value.

Alternatively, the distributing means may comprise a further variable delay circuit the delay of which is variable in discrete units of delay each of which is substantially equal to a small integral multiple of a line period, and means for varying, by one discrete deay unit at regular time intervals each of which is equal to an integral multiple of one output line period, the delay of the further delay circuit from a first to a second extreme value, one of these values being a maximum and the other a minimum value, and for returning the delay directly to the first extreme value.

By a small integral multiple of any value is meant a multiple of one, two, three or four times that value, and by a small integral number is meant any of the numbers one, two, three or four.

The alternative distributing means result in two types of system which will be referred to as types 1 and 2 according to whether the said discrete units of delay are substantially equal to a small integral multiple of the difference between an input and an output line period or to a small integral multiple of a line period respectively.

A comparison between systems of type 1 and 2 and the aforesaid second field conversion system is given briefly below:

(1) A type 1 system can use a modified line store converter as described in British patent specification No. 966,318 or 928,730, to perform the functions of interpolation and timing correction, as a separate independent unit in the converter. A type 2 system and the second field conversion system can use separately the interpolation and storage units of the line store converter described in British patent specification No. 928,730. The line store converter described in British patent specification No. 966,318 cannot be used in this arrangement.

(2) A type 2 system and the second field conversion system can be constructed in a form which does not use a line store, and which can convert from an input signal having an accurately controlled field frequency to an output signal whose field frequency is locked to the input field frequency. This facility is useful only to convert tape recorded material. A type 1 system must use a line store converter.

(3) If a line store is used in a type 2 system or in the second field frequency system, all three systems under consideration have the facility to convert in a locked five to six ratio with a relatively wide tolerance on input field frequency. This allows both live and recorded monochrome signals to be converted.

(4) By making small modifications to the switch control logic, and if necessary adding small further storage facilities to the type 1 system when a line store converter as described in British patent specification No. 966,318 is used, the output signal can be locked to a frequency independent of the input frequency. This allows signals with frequencies and tolerances of the colour television standards to be converted both live and recorded.

(5) In the type 1 and type 2 systems, the delays in the distributing store (the second delay circuit) are used in an identical manner during successive fields, whereas in the second field conversion system none of the delays are used in an identical manner during successive fields. This results in the type 1 and type 2 systems having several small advantages over the second field frequency conversion system. For example, advantage can be taken of the field blanking interval and field synchronizing pulse to perform some of the switching logic in a five to six ratio locked conversion. Also distortions in some of the delay elements cause disturbances to the picture which are stationary in the type 1 and type 2 systems but are moving in the second field frequency conversion system. Stationary disturbances to a picture are generally less visible than moving ones.

(6) Since the interpolation is performed in the line-store converter in the type 1 system but is performed in separate units in the type 2 system, it is more difficult to adapt the type 1 system to include interpolation between picture lines and interpolation to correct for movement errors due to the regular omission or insertion of fields. Both processes require access to adjacent line signals of successive fields and necessitate the inclusion of at least one extra field delay. If such interpolation systems are required in practice, there is a preference for using the type 2 system rather than the type 1 system.

Figure 2:
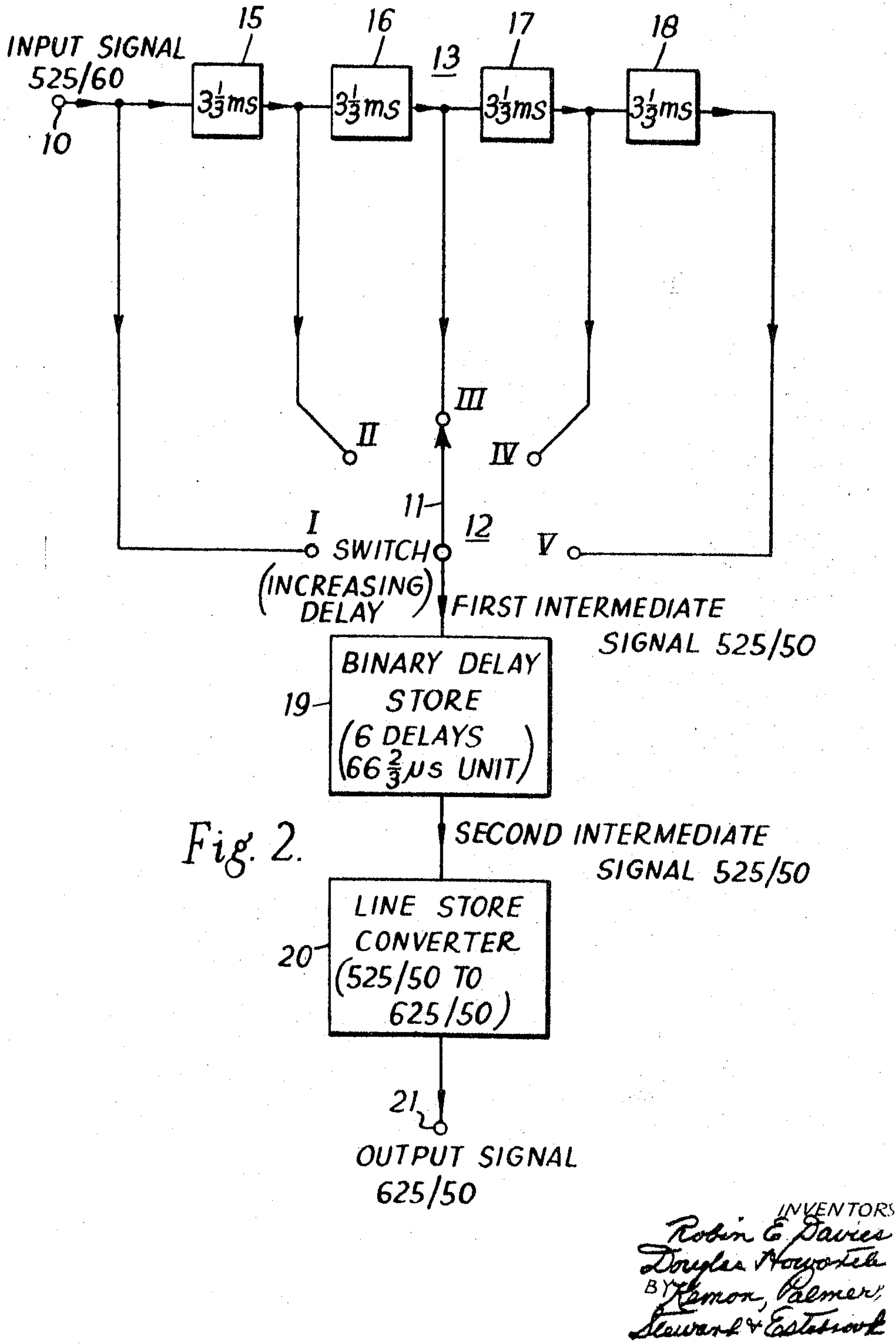
Figure 3:
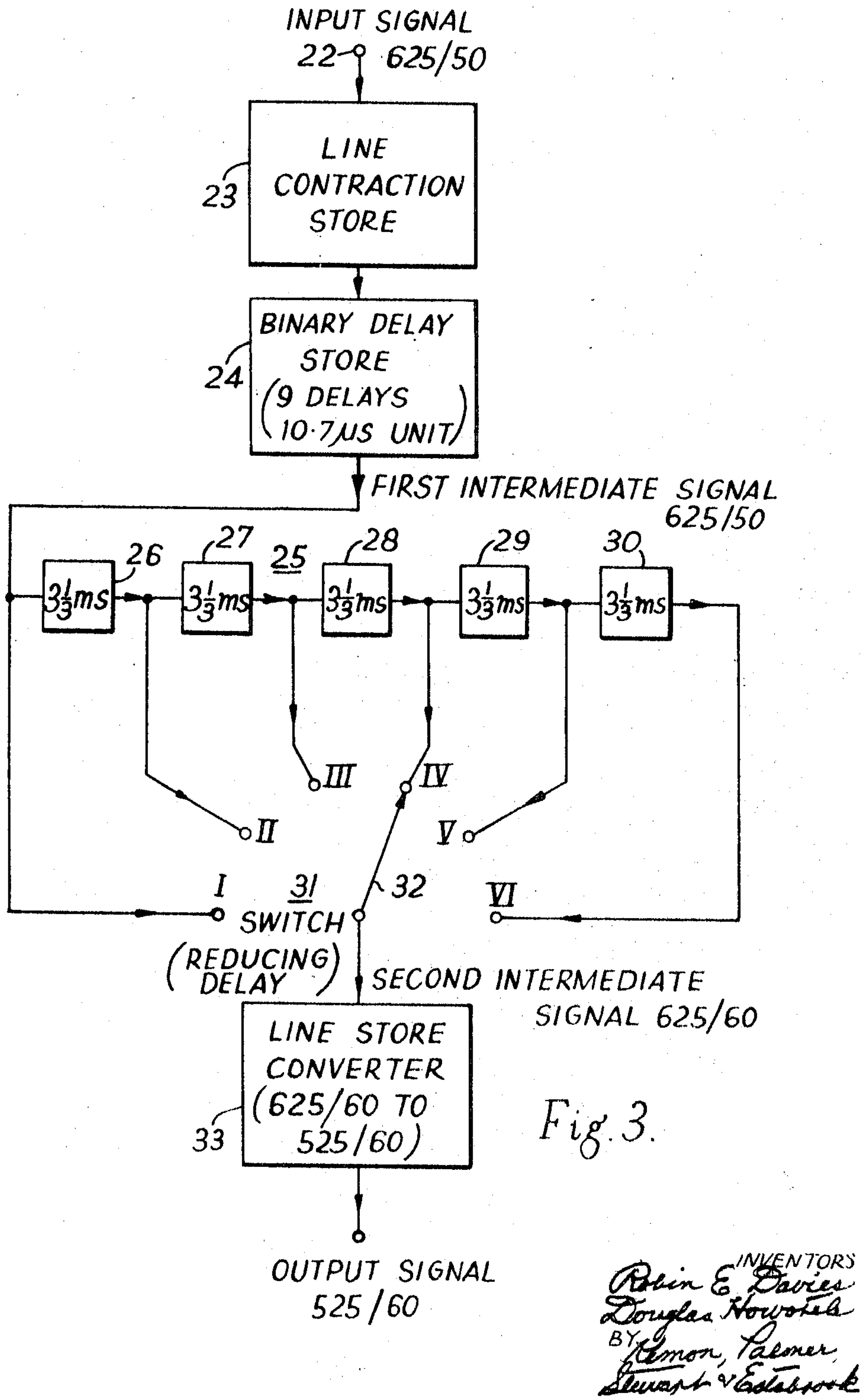
Figure 4:
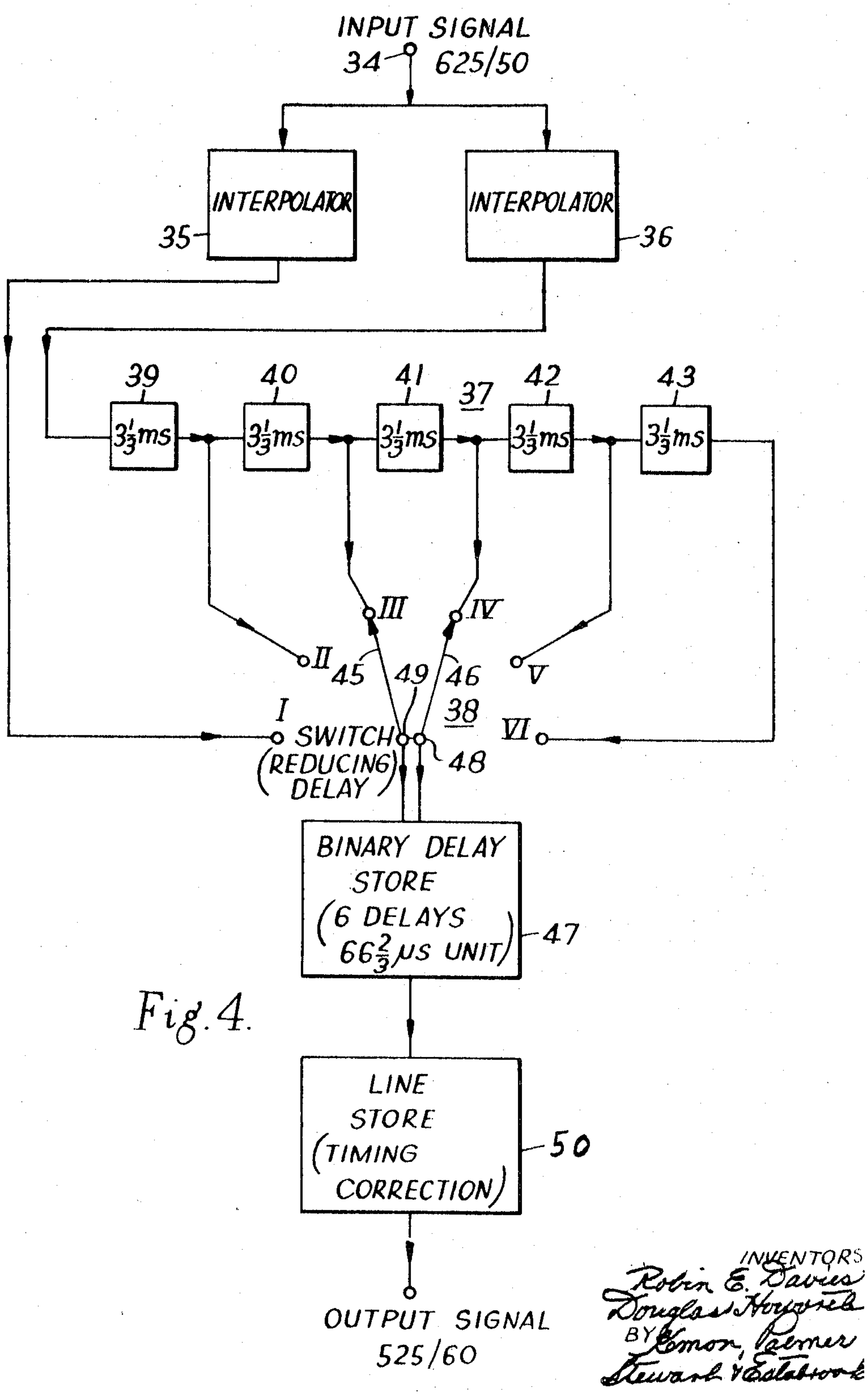
Figure 5:
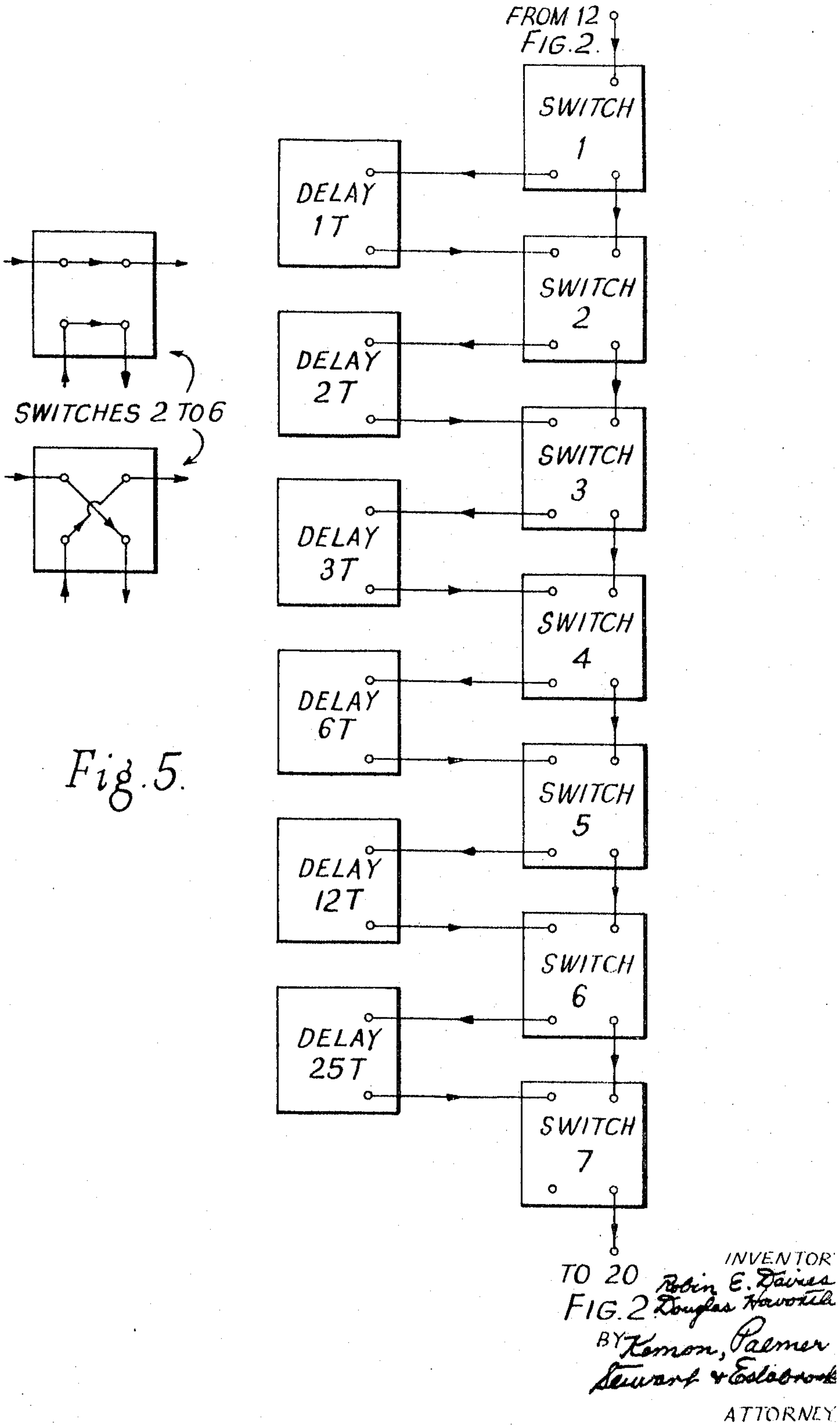
Figure 6:
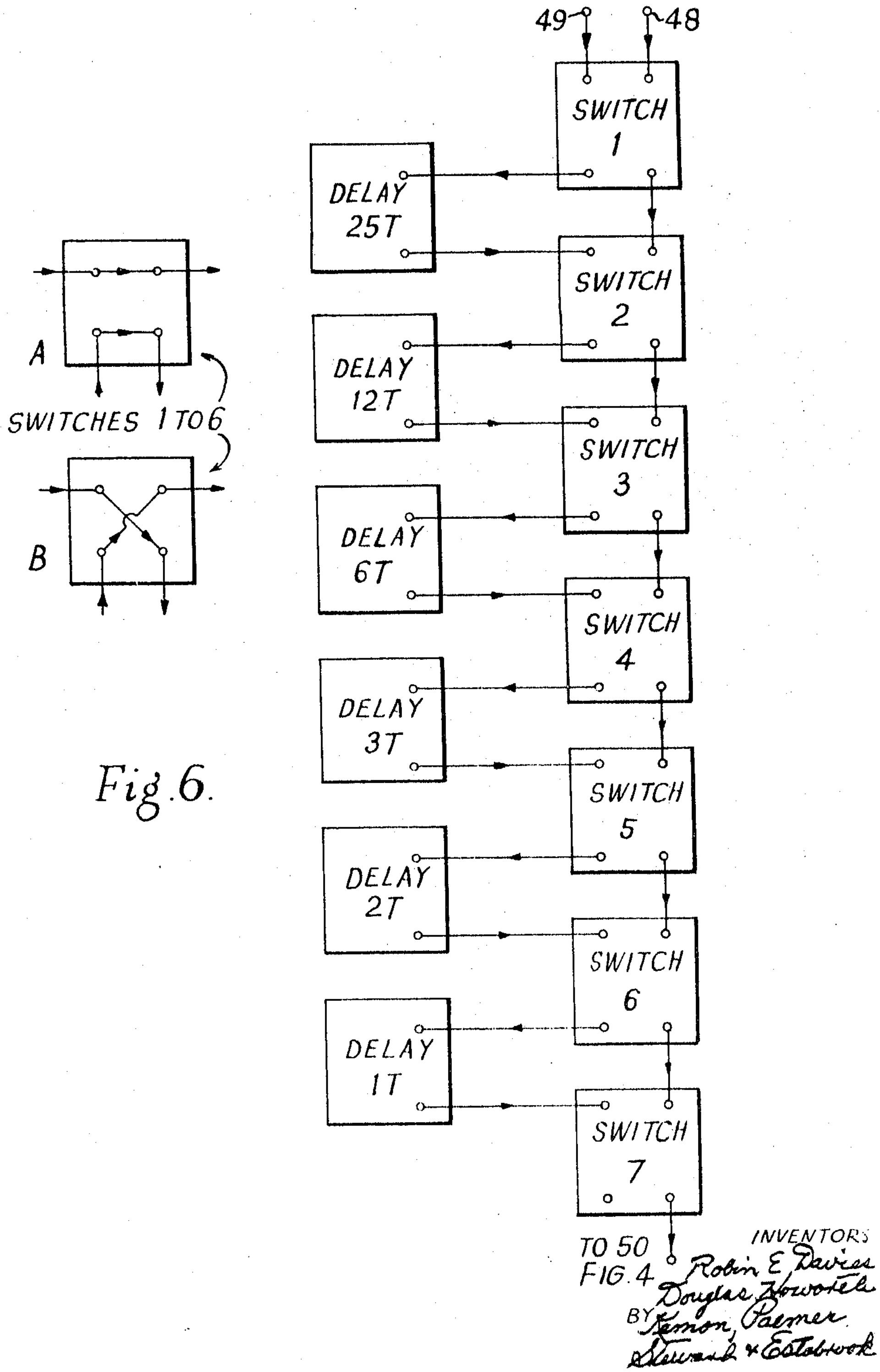

Embodiments of the invention will now be described by way of example with reference to the accompanying drawings, in which:

FIGS. 1 and 2 are block circuit diagrams of alternative apparatus, embodying the invention, for converting a television signal from a 525/60 standard to a 625/50 standard, FIGS. 3 and 4 are block circuit diagrams of alternative apparatus, also embodying the invention, for converting a television signal from a 625/50 standard to a 525/60 standard, and FIGS. 5 and 6 are block diagrams corresponding to those of FIGS. 2 and 4 respectively showing modified apparatus according to the invention.

FIG. 1 shows apparatus for converting a television signal from a 525/60 standard to a 625/50 standard. The input 525/60 signal is fed from an input terminal 10 to a first variable delay circuit 13 consisting of four delay elements 15, 16, 17 and 18 (each having a delay value of 3⅓ ms.) and a switch 12. The circuit 13 is similar to that described with reference to FIG. 1 of the parent specification. The effect of the circuit 13, as will be described, is to produce a first intermediate signal leaving the switch 12 and having 50 fields per second, each field containing 525/2 lines, and each field being separated from the next adjacent field by a gap of 3⅓ms. duration in the useful information carried by the signal.

One cycle of conversion of the circuit 13 will be described. Firstly, a wiper 11 of the switch 12 is connected to a terminal I. The first input field of the cycle passes directly through the switch 12 to form the first field of the first intermediate signal. At the end of the first input field the wiper 11 moves to a terminal II so that the delay element 15 is introduced in the path of the input signal. For the next 3⅓ ms. the signal leaving the switch 12 consists of the end of the first input field, which is repeated as a result of the 3⅓ ms. delay which has been introduced. This repeated information is not useful and is discarded at a later stage in the conversion. Thus a gap in useful information of duration 3⅓ ms. is introduced in the first intermediate signal, and the second input field is then passed through the delay element 15 to the switch 12 to form the second field of the first intermediate signal. This process is repeated as the wiper 11 moves to terminals III, IV and V in turn. At the end of the fifth input field, the wiper 11 returns directly to the terminal I, a gap of 3⅓ ms. duration in the useful information carried is introduced in the first intermediate signal, and the seventh input field is then passed through the switch 12 to form the sixth field of the first intermediate signal. The information of the sixth input field is lost as this field is discarded.

The gaps in information which occur in the first intermediate signal may occur as actual blanks in the signal or may consist of repeated information from input fields.

The 525/50 first intermediate signal is next fed to a second variable delay circuit constituted by a binary delay store 19. The binary delay store 19 consists of eight delay elements having delay values of 12.7 μs., 2×12.7 μs., 4×12.7 μs., 8×12.7 μs. and so on. The delay elements are arranged substantially in the manner described with reference to FIGS. 5(*a*) and (*b*) of the parent specification. The first intermediate signal is switched through different combinations of the delay elements in the binary delay store 19 in such a manner that the delay introduced by the delay store is increased by 12.7 μs. at the end of each line period of the signal. The result of this is that the lines of each field of the first intermediate signal are evenly distributed throughout the field period. The 3⅓ ms. gap in useful information, which occurred at the end of each field period, is now split up into a number of gaps of duration equal to 12.7 μs., these gaps being evenly distributed between the lines of each field.

The unit of delay of the binary delay store 19 is ⅕×63.5 μs.=12.7 μs., this being appropriate to spread 525/2 lines at 63.5 μs. intervals over a time of 20 ms., the output field time. The maximum delay required in the binary delay store 19 is 3⅓ ms., and hence eight delay elements are required in the binary relationship described in the parent specification.

The signal in which the lines are evently distributed throughout each field period constitutes a second intermediate signal while also has 50 fields per second and 525/2 lines per field. The second intermediate signal is fed to a standards converter 20 for converting signals from one line standard to another. The converter 20 preferably consists of one of the converters described in British patent specification No. 928,730 or 966,318 or in the specification accompanying our British Patent No. 1,025,-512. These line standards converters are called line-store converters.

The line-store converter 20 converts the second intermediate signal from a 525/50 standard to a 625/50 standard to provide at a terminal 21 the required output signal at the 625/50 standard.

FIG. 2 shows apparatus which is also for converting a television signal from a 525/60 standard to a 625/50 standard. The apparatus of FIG. 2 is closed similar to that of FIG. 1, but is modified in that the manner of operation of the binary delay store 19 is different. Circuit elements serving the same purposes in FIGS. 1 and 2 are indicated by the same reference numerals in the two figures.

In the apparatus of FIG. 2, the first intermediate signal is produced by the variable delay circuit 13 in the same manner as in FIG. 1. The first intermediate signal is fed to the binary delay store 19 which, in this embodiment, consists of six delay elements, having delay values equal to or approximately equal to one input line period, two input line periods, four input line periods, and so on. In the present embodiment, the delay unit of the binary delay store 19 is equal to 66⅔ μs. The first intermediate signal is fed through various combinations of the delay elements of the store 19 in such a manner that the delay introduced in the signal is increased by one unit at time intervals equal to either five or six input line periods. The result of this step is again to spread the 3⅓ ms. gap in useful information (which occurs after each field of the first intermediate signal) over each field of the second intermediate signal. This is achieved in the binary delay store 19 by making blank every fifth line of the second intermediate signal.

If the signal were displayed, there would be blank lines once every five lines down the picture, but the whole raster would be filled with information (apart from a few lines of field blanking). This is the situation well-known in connection with 405/50 to 625/50 conversion and a line store converter such as described in the specification accompanying our British Patent No. 1,025,512 can be used to interpolate appropriately and fill in the blank lines with appropriate new line signals. The line store converter described in British patent specification No. 966,318 cannot be used since it relies on the maintenance of a linear relationship between time of entry of signals and vertical position of the information contained in those signals.

The unit of delay in the binary delay store 19 is ideally 66⅔ μs., but the effect of using a different unit is only a fractional alteration in the height of the resultant picture so that a slightly different unit could be used. The total number of delay changes per field has to be about 50 and hence six binary delay elements are sufficient.

In practice, the binary delay store 19 of FIG. 2 would be uneconomic if delays 1T, 2T, 4T, 8T, 16T and 32T were employed (where T is the unit delay), since a maximum delay of 63T is available, whereas a maximum of only 49T is required. Moreover, when the delay is changed from maximum to zero (49T to 0) for the beginning of each field, extra by-pass routes would be needed for some of the delays with consequent increase in switching complexity.

An alternative arrangement, shown in FIG. 5, largely overcomes these difficulties. The delays are 1T, 2T, 3T, 6T, 12T and 25T, a total of 49T. No extra by-pass routes are required.

In FIG. 5 the switches 1 and 7 are one-pole two-way switches and the switches 2 to 6 are interchange switches giving the alternative connections shown at A and B.

FIG. 3 shows apparatus for converting a television signal from a 625/50 standard to a 525/60 standard. This apparatus operates in a manner similar to that of FIG. 1, but the conversion is in the opposite direction. An input television signal at the 625/50 standard is fed from an input terminal 22, through a lines contraction store 23 (the presence of which is necessitated by subsequent conversion steps, as will be explained), to a first variable delay circuit constituted by a binary delay store 24. The binary delay store 24 consists of 9 delay elements having delay values equal to 10.7 μs., 2×10.7 μs., 4×10.7 μs. and so on. The delay elements are arranged substantially in the manner described with reference to FIGS. 5(*a*) and 5(*b*) of the parent application. The input signal is fed through various combinations of the delay elements in the store 24 in such a manner that the delay introduced in the signal is reduced by 10.7 μs. at the end of each input line line period, in a process similar to that described in the parent specification. The result of this step is to form a first intermediate signal, leaving the binary delay store 24, in which each field has been compressed to have a period of duration 3⅓ ms. less than an input field period. This has been achieved by discarding 10.7 μs. of each line period of the input signal, thus reducing the line duration to 53.3 μs. Since the active line duration of the input signal is 52 μs. there only remains 1.3 μs. to perform switching functions and to include synchronising information. If this is insufficient the short store 23 is included to contract the active line length by a few microseconds. This may consist of input and output rings of fast switches separating storage capacitances. The reading clock in such a store would run slightly faster than the writing clock to contract the line length.

The units of delay in the binary delay store 24 is ⅙×64μs.=10.7μs., and thus, by comparison with the store 19 in FIG. 1, different stores are apparently needed for the two directions of conversion.

However, if a unit between 10.7μs and 12.7μs is used, the result is to alter the height of the active picture by about one in sixty, or approximately four lines. This is acceptable since the standard signals on the 525/60 and 625/50 standards contain about four lines difference, the active field length being greater on the 525/60 standard. Thus, after conversion the active picture contains the nominally correct number of active lines.

Because the input fields have been compressed, there occurs in the first intermediate signal after each field a gap of 3⅓ ms. in the useful information carried. The first intermediate signal is fed to a second variable delay circuit 25 consisting of five day elements 26, 27, 28 29 and 30 (each having a delay value of 3⅓ ms.), and a switch 31. The circuit 25 operates in the same manner as the circuit described with reference to FIG. 3 of the parent specification.

One cycle of conversion of the circuit 25 will be described briefly. At the beginning of the cycle a wiper 32 of the switch 31 is connected to a terminal V. The first intermediate signal is fed through the delay elements 26, 27, 28, and 29 to the output of the switch 31. At the end of the first field period of the first intermediate signal, a gap in useful information of 3⅓ ms. duration occurs. At the commencement of this gap the wiper 32 moves to a terminal IV, reducing the delay introduced in the signal by 3⅓ ms. At terminal IV, the second field of the first intermediate signal emerges substantially immediately after the end of the first field at terminal V. The gap of 3⅓ ms. is removed by the reduction of total delay introduced by 3⅓ ms. The process is repeated as the wiper 32 moves to terminals III, II and I in turn. At the end of the fifth field of the first intermediate signal, the wiper moves directly to a terminal VI where the fifth field of the first intermediate signal is read out again. This repeated field forms the sixth field of the second intermediate signal. At the end of this field, the wiper 32 moves to the terminal V, thus completing the cycle.

The second intermediate signal which leaves the output of the switch 32 consists of a signal having 60 fields per second and 625/2 lines per field. The signal passes to a line store converter 33 which conveniently may be one of the converters referred to in connection with the converter 20 of FIG. 1.

FIG. 4 shows apparatus for converting a television signal from a 625/50 standard to a 525/60 standard. The method of operation of the apparatus is based on the same steps of conversion as those described with reference to FIG. 2, although the conversion is, of course, in the opposite direction. It is more difficult, however, to reverse the conversion carried out in the apparatus of FIG. 2 than it is with that of FIG. 1. In the circuits shown in FIGS. 1 to 3, the line store converters 20 and 33 carry out the two functions of interpolation of information of adjacent lines, and timing correction of the lines of the output signals. In the apparatus of FIG. 4 it is not possible to use an independent line store converter as a complete unit, since the functions of interpolation and timing correction have to be separated. The function of interpolation has to be carried out prior to field contraction in the binary delay store to prevent loss of information before interpolation.

In the apparatus of FIG. 4 an input television signal at the 625/50 standard is fed from an input terminal 34 to two interpolators 35 and 36. These interpolators operate to combine information from lines of the input signal to provide information suitable to be processed in a variable delay circuit constituted by a binary delay store 47 which will be described below. The interpolators may, for example, be similar to those described in the specification accompanying our British Patent No. 1,025,512, which specification deals with a particular method of line conversion.

The output of the interpolator 36 is fed to a first variable delay circuit 37 consisting of five delay elements 39, 40, 41, 42 and 43 (each having a delay value of 3⅓ ms.), and a switch 38. The switch 38 has two wipers 45 and 46 which make contact in turn with six terminals VI, V, IV, III, II and I. The wipers 45 and 46 are so arranged that at all times they contact two adjacent terminals.

One cycle of conversion of the circuit 37 will be described. With the wiper 46 at terminal V and the wiper 45 at terminal IV, the first field from the interpolator 36 passes through the delay elements 39, 40, 41 and 42 to an output terminal 48 of the switch 38. At a time 3⅓ ms. before the end of the first field, the wipers 45 and 46 move to contacts III and IV, respectively. The second field of the signal from the interpolator 36 immediately begins to emerge from the terminal 48, but it is apparent that 3⅓ ms. duration of the end of the first field is missing from the signal leaving the terminal 48. However, this information is not lost, as the information missing at the terminal 48 has already been fed to the terminal 49 during the time interval when the wiper 45 was connected to the terminal IV. The switching arrangements of the binary delay store 47 are such that the information arriving from the two terminals 48 and 49 is correctly combined to form one signal leaving the store 47.

The process described above is repeated as the wapers 45 and 46 contact the terminals III, II and I in turn, until the wiper 46 is connected to terminal I and the wiper 45 to terminal VI. The fifth field of the input signal is fed through the interpolator 35 to terminal I and thence to the output terminal 48. At a time 3⅓ ms. before the end of the fifth input field, the wiper 46 moves to the terminal VI and the wiper 45 to the terminal V. A second version of the fifth input field then appears again at the terminal 48 to be repeated in the signal fed to the store 47 and to form the sixth field of that signal. The repeated field comes, however, from the interpolator 36 and has been subjected to a different interpolation process from that of the interpolator 35. This is necessary as the fifth field and the repeated fifth field appear at different times in the final output signal.

The binary delay store 47 consists of six delay elements having delay values of 66⅔ μs, 2×66⅔ μs, 4×66⅔ μs., and so on. The elements are arranged in a manner similar to that described with reference to FIG. 5 (*a*) and 5(*b*) of the parent specification. The signal from the terminal 48 is passed through various combinations of the delay elements in the store 47 in such a manner that the delay introduced in the signal is reduced by substantially one line period at regular time intervals equal to five line periods. The useful part of the signal from the terminal 49 is treated in the same manner and the processed signals are combined to form one signal at the output of the store 47. In this signal, approximately 50 lines have been discarded from each field, and these lines are discarded from positions which are evenly distributed through each field. The interpolation carried out in the interpolators 35 and 36 is so arranged that the remaining lines are suitable to form a television picture. The signal leaving the store 47 is passed to a line store 50 which merely makes timing corrections required in the output signal.

The signal leaving the terminal 48 and the useful part of the signal 49 can be regarded as providing, together, a signal having 60 fields per second and 625/2 lines per field. The signal leaving the store 47 has 60 fields per second and 525/2 lines per field. The final output signal at the 525/60 standard appears at the output of the lines store 50.

In practice the binary delay store 47 of FIG. 4 would be uneconomic if delays 1T, 2T, 4T, 8T, 16T and 32T were employed, since a maximum delay of 63T is available, whereas a maximum of only 49T is required. Moreover, when the delay is changed from zero to maximum ( 0 to 49T) for the beginning of each field, extra by-pass routes would be needed for some of the delays with consequent increase of switching complexity.

An alternative arrangement shown in FIG. 6 largely overcomes these difficulties. The delays are 1T, 2T, 3T, 6T, 12T and 25T, a total of 49T. No extra by-pass routes are required. The switch 7 in FIG. 6 is a one-pole two-way switch and switches 1 to 6 are interchange switches giving the alternate connections shown at A and B.

It will be appreciated that the variable delay circuits shown in the figures as binary delay stores 19, 24 and 47, are not limited to such delay circuits. For examples, to obtain the various delays required, circuits may be used which divide down from a basic unit of 3⅓ ms. rather than multiplying up from a much smaller unit.

In the descriptions above, it is assumed that the input field frequency is at its nominal value of 50 c./s. or 60 c./s., and that the output field frequency is locked to the input frequency in the ratio of six to five or five to six. If the input field frequency is slightly different from its nominal value, or if the delays introduced are slightly different from their correct values (due to errors in manufacture of the delay elements), there will be delay errors in the signal at the input to the line store converter. These can be removed in the line store converter. However, if there is used, in the systems described with reference to FIGS. 1 and 3, a line store converter of the type described in British patent specification No. 966,318, which converter relies on the maintenance of a linear relationship between time of entry of signal and vertical position of the information contained in those signals, the correction of timing errors will imply an error in the interpolation. It is likely that a timing error of less than 5 μs. would produce no noticeable deterioration of the picture. Thus it is safe to use this converter only if delay errors amount to no more than 5 μs., and if the input fiield frequency departs from the nominal value by no more than 1 part in 4000, an error equivalent to about 5 μs. change in field duration.

The unit of delay in the binary delay store is about12 μs., and by further subdividing this unit and including, for example, a 4 μs. delay and an 8 μs. delay, the errors in timing of the signal can be reduced to such a level that they never exceed 4 μs. The departure of the input field frequency from the nominal value can now be allowed to increase.

With the addition of the shorter delays to the type 1 system as described in the above paragraph, slave-locking of the output signal is possible in both the type 1 and type 2 systems (i.e. locking the output field frequency to an independent source). The ratio of field frequencies is no longer exactly five to six and the cycle of increasing or decreasing delay can no longer be an exact number of fields of the input standard. It is possible to change the delay from one extreme value to the other in such a manner that sometimes the cycles are restarted during the active part of the field and no always during the field blanking period as is the case if the field frequency ratio is exactly five to six. Each cycle must be such that zero delay is introduced at times when the input and output line signals correspond to the same vertical position in the picture. Alternatively, it is possible to include an extra 3⅓ ms. delay so that there are now 5 x3⅓ ms. delays for 525/60 to 625/50 conversion (FIGS. 1 and 3) and 6 x 3⅓ ms. delays for625/50 to 525/60 conversion (FIGS. 2 and 4). The total delay is then sufficient to allow the change to a new cycle to take place during the field-blanking interval but, since the field-blanking intervals on the input and output standards may not coincide the initial delay at the beginning of the cycle may not be zero.

One method of determining when the input and output signals correspond to the same vertical position on the picture is as follows. The line synchronising pulses of the input signal, say at the 525/60 standard, are compared with a train of line synchronising pulses at an artificial 525/50 standard produced by multiplying the line frequency of the output 625/50 signal by 21/25. The field synchronising pulses of the artificial signal are synchronised with the output field synchronising pulse. Two counters are arranged to count the line synchronising pulses of the input 525/60 signal and the artificial 525/50 signal respectively. Each counter is reset to zero at the beginning of each field of the signal individual to that counter. Each counter counts a total of 525/2 line synchronising pulses before being reset. A comparison circuit compares the counts on the two counters and produces a triggering signal each time the counts on the two counters are equal. The triggering signal starts a fresh cycle of field conversion with the delay introduced equal to zero.

What is claimed is:

1. Apparatus for generating at an output terminal, from an input television signal applied at an input terminal, an output television signal having a different field repetition frequency from that of the input signal, said apparatus comprising a variable delay circuit coupled between said input and output circuits, the delay of said delay circuit being variable between extreme values in discrete units of delay, each of which is substantially equal to a small integral multiple of the difference between an input field period and an output field period, means for changing by one discrete delay unit at regular time intervals, each of which time intervals is equal to a small integral multiple of one output field period, the delay of said delay circuit from one extreme value to the other extreme value and for returning the delay directly to said one extreme value, and means for effecting a substantially uniform distribution over the fields of the output signal of the discrete-unit delay introduced in the input signal by said variable delay circuit.

2. Apparatus according to claim 1, for reducing the field repetition frequency, wherein said delay-changing means effect an increase, by one discrete delay unit at said regular time intervals from a minimum to a maximum value of delay and thereafter return said delay directly to said minimum value, the difference between the maximum and minimum values of the delay being such that, on the return of the delay to the minimum value, a small integral number of input fields are discarded from the input signal.

3. Apparatus according to claim 1, for increasing the field repetition frequency, wherein said delay-changing means effect a decrease by one discrete delay unit at said regular time intervals from a maximum to a minimum value of delay and thereafter return said delay directly to said maximum value, the difference between the maximum and minimum value of the delay being such that, on the return of the delay to the maximum value, a small integral number of output fields are repeated in the output signal.

4. Apparatus according to claim 1, wherein said distributing means comprise a further variable delay circuit the delay of which is variable in discrete units of delay each of which is substantially equal to a small integral multiple of the difference between an input line period and an output line period, and means for varying, by one discrete delay unit at regular time intervals each of which is equal to a small integral multiple of one output line period, the delay of the further delay circuit from a first to a second extreme value, one of these values being a maximum and the other a minimum value, and for returning the delay directly to the first extreme value.

5. Apparatus according to claim 1, wherein said distributing means comprise a further variable delay circuit the delay of which is variable in discrete units of delay each of which is substantially equal to a small integral multiple of a line period, and means for varying, by one discrete delay unit at regular time intervals each of which is equal to an integral multiple of one output line period, the delay of the further delay circuit from a first to a second extreme value, one of these values being a maximum and the other a minimum value, and for returning the delay directly to the first extreme value.

No references cited.

ROBERT L. GRIFFIN, Primary Examiner
R. K. ECKERT, Jr., Assistant Examiner

U.S. Cl. X.R.

328—56; 333—29